Sept. 24, 1946.    G. C. SCHÜLE    2,408,126
APPARATUS FOR INFLATING TIRES
Filed Jan. 13, 1944    2 Sheets-Sheet 1

Inventor
Georges C. Schule.

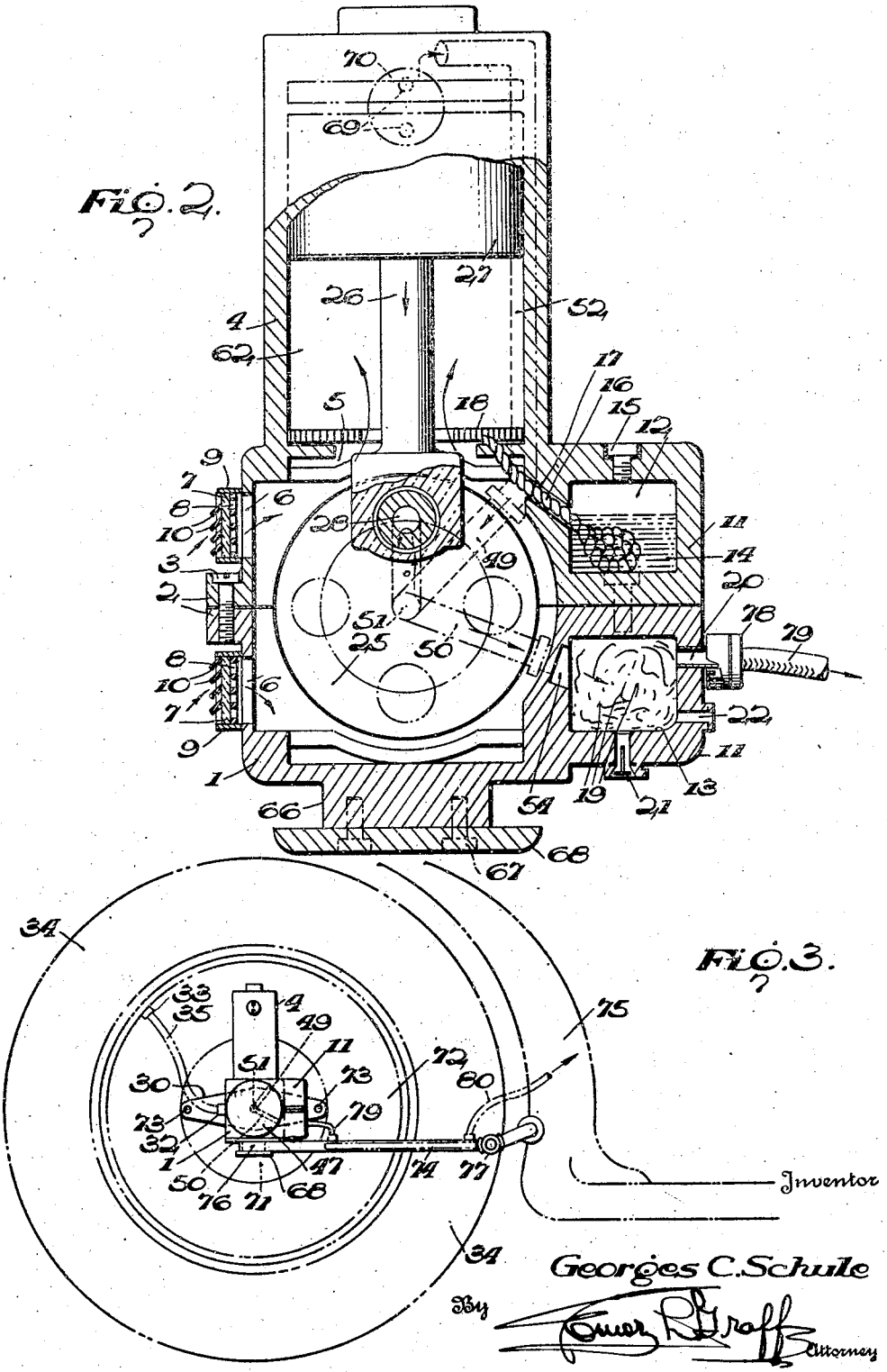

Patented Sept. 24, 1946

2,408,126

UNITED STATES PATENT OFFICE 2,408,126

APPARATUS FOR INFLATING TIRES

Georges Charles Schüle, Buenos Aires, Argentina

Application January 13, 1944, Serial No. 518,134

4 Claims. (Cl. 152—419)

This invention relates to a novel type of compressor for supplying air under pressure to the tires of automobiles, trucks and similar vehicles, and substantially has for object an improved compressor of simple construction, adapted for performing the automatic supply of compressed air to the several tires of a vehicle while the same is travelling, and thus maintain the necessary degree of pressure in the same.

The novel type of apparatus in accordance with this invention offers, besides, the advantage of being readily and speedily installed on motor vehicles of any type, mark or design, without necessity of introducing any substantial modifications into the parts or organs of the vehicle.

The invention also views other objects which will more fully be understood from a consideration of the following specification.

In order to facilitate the understanding of this invention and carry the same readily into practice, a preferred embodiment of the same has been shown by way of example in the accompanying drawings, wherein:

Figure 2 is another diametric view in elevation and section, of the same compressor, the section being taken on the line A—A of Figure 1, and Figure 3 is a diagrammatic detail which illustrates the manner of mounting the improved compressor on one of the wheels of a motor car.

In all the said figures, similar numbers of reference have been used to indicate like or corresponding parts.

Figure 1:
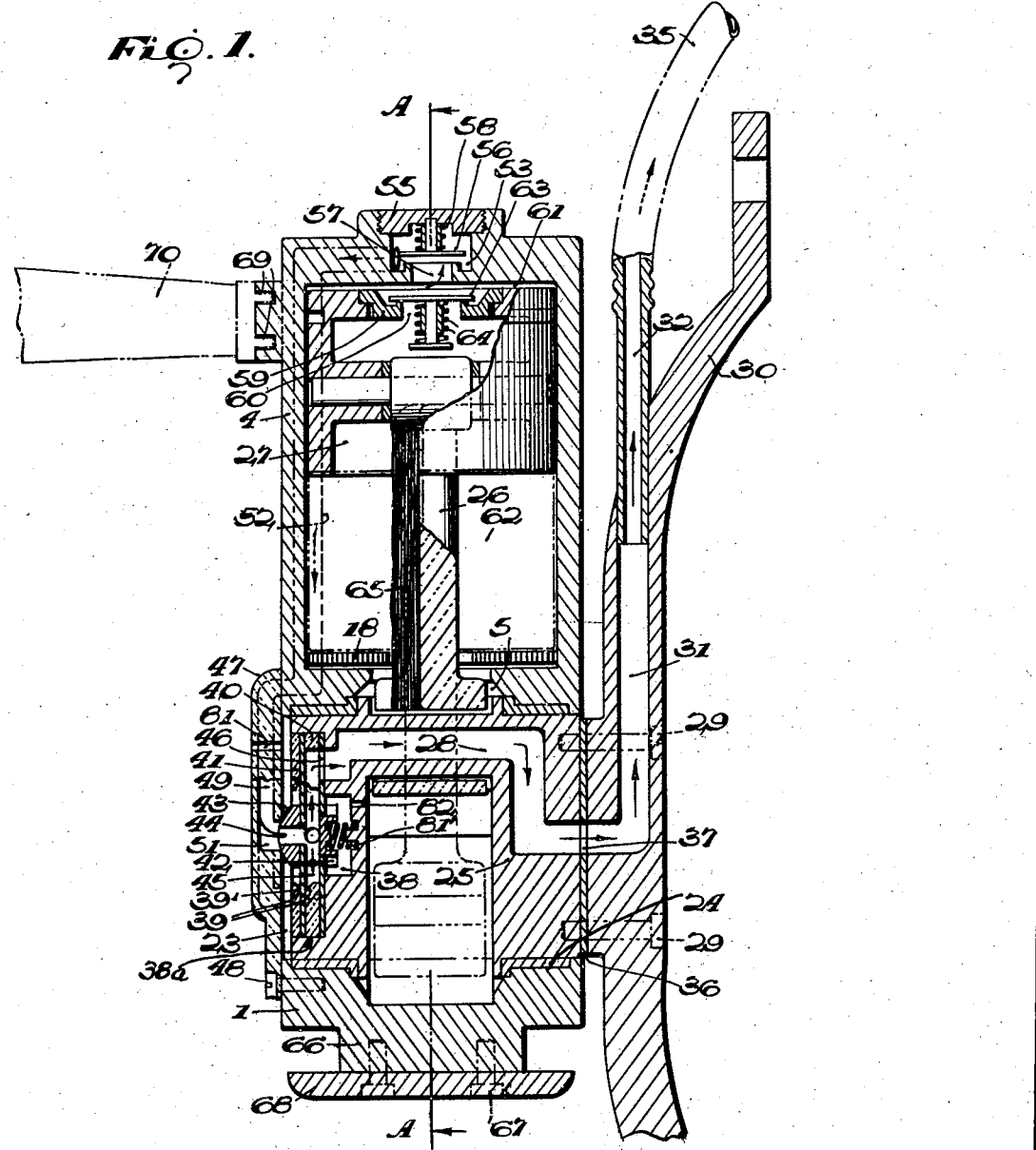
Figure 1 is a diametric section, in elevation, of the novel type of compressor, in accordance with this invention, and of the means for securing the same to a vehicle.

In the form of construction shown, the novel type of compressor in accordance with this invention, substantially consists of a metallic casing or crank-case 1, of parallelopipedic shape and preferably formed by two vertically juxtaposed parts, conveniently secured together by means of flanges 2 and screw bolts 3, or the like. From the top of the casing 1 extends vertically a cylinder 4 which, if desired, may be formed integral with said casing or consist of an independent element, adapted to be secured to the casing 1 by means of screw bolts or similar means and in communication with said casing by means of a port 5.

With reference to Figure 2 it will also be seen that in one of the sides of the casing 1, openings 6, preferably of rectangular shape, are provided, covered on their outer side by an air filter. This filter comprises a piece of felt, tow or similar material, to the inner side of which is applied a plate 8, of perforate metal or wire gauze, and the felt and gauze are mounted in a cup-like frame 9 whose side wall is adapted to be affixed by means of screws or other suitable elements, to the outer side of said openings, while its bottom wall is formed with a plurality of longitudinal shutter-like openings 10, for the admission of air from outside.

At the opposite side of said casing 1 is formed an extension 11, formed integral with the same or as a separate body, adapted to be secured to the casing 1 by any suitable means and in which two chambers 12 and 13 are formed. The chamber 12 is charged with a certain amount of oil 14, or other lubricant, introduced into the compartment by an upper opening, adapted to be closed by a screw 15 or similar means, and in which a wick 16 of absorbent material is submerged, inserted through a hole 17 provided in the chamber, the wick 16 extending to the bottom of the cylinder 4, where it is in contact with a disc 18 of felt or other suitable absorbing material which bears against the upper end of the casing 1.

The chamber 13 contains a filter formed by a body 19 of tow, wool or other suitable material, for filtering the air discharged, as will be explained later on, through a duct 20 which extends through one of the walls of the chamber. The chamber is also provided with a small valve or exhaust cock 21, and a safety valve 22, for balancing any excessive pressure arising in the circuit, provided, if desired, with manual means for controlling said pressures and adjusting the same to the maximum desired.

With reference to the drawings it will further be seen that through the entre casing 1 extends a horizontal bore 23, of suitable diameter and lined on its inner surface by a tubular bushing 24, of antifrictional metal, and in said bushing a crank shaft 25 is conveniently mounted, to the central part of which is rotatably connected a connecting rod 26, for the reciprocating operation of a plunger or piston head 27 of the usual type, slidably mounted in the cylinder 4, above referred to. Through the entire length of the crank shaft 25 extends a duct 28, conveniently bent and with its outlet arranged at the centre of said shaft.

One of the ends of the crank shaft 25 is flush with the outer surface of the casing 1, being connected by screws or similar means 29 to a bracket 30, of conveniently curved shape for its rotative operation, to be described later on.

Through said arm 30 extends in radial direction a duct 31, formed with the necessary bend, the inlet of which registers with the duct 28 of the crank shaft 25, having applied to its outlet a tightly fitting short metallic tube 32, to be connected with the feed valve 33 of the tire 34 of the wheel by means of a flexible tube 35, of rubber or the like, provided in its interior with any suitable means for holding the usual ball of said valve permanently in its open position.

In order to assure a perfectly tight joint between said elements 25 and 30, a packing disc 36, of suitable material, is inserted between the surfaces of the same, the disc 36 being also provided with a bore 37 in correspondence with the ducts 28 and 31 of said elements.

The opposite end of the crank shaft 25 is formed with a series of recesses 38 and 38ª, of annular shape, in which latter recess 38ª fits an air transfer unit which supplies compressed air to duct 28 as will hereinafter more fully appear, said unit including two membranes or diaphragms 39, formed of one or several layers of leather or other flexible and impervious material, held separated one from the other by a flat washer 40 and adjusted in position by means of a metallic rim or perforate disc 41, connected to the member 25 by means of screws or the like, not shown.

When referring to the drawings, it will be seen that said membranes or diaphragms 39 are connected at their center to a metallic bushing 42, formed at its outer end with an extension 43 of substantially semi-spherical shape, through which extends, in axial direction, a duct 44, and from the bottom of which latter extend, in radial directions, several small ducts 45 which open into the space formed between the said membranes, and communicate by means of a perforation 46 in one of said membranes, with the duct 28 of the crank shaft 25.

The members 40 and 41 have their adjacent internal edges beveled, as indicated at 39', for the purpose of preventing chafing of the outer diaphragm 39 and to also make the area of the inner face of the outer diaphragm substantially equal to the area of the inner face of the inner diaphragm to compensate for the loss in area of the inner face of the outer diaphragm due to the diameter of the orifice 44, since it is desirable for efficient operation to have the pressures acting on the inner faces of both diaphragms substantially the same.

A cover plate 47 serves to tightly seal the opening 23 of the casing 1, being firmly secured to the front of this latter by screws 48 or similar means; through said cover extend two radial ducts 49 and 50, with their inlet end at the inner side of said cover and arranged one with regard to the other at an angle of about 60°, as indicated with dotted lines in Figure 2, the said ducts converging to one single duct 51, which is in axial registry with the central duct 44 of the extension 43 of the central bushing.

The duct 49 communicates at its outer end with another flat duct 52, vertically extending through the inner wall of the cylinder 4 and which opens, at its outer end, into the interior of a chamber 53, formed in the head of said cylinder. The duct 50, in turn, communicates at its outlet end with another duct 54, Fig. 2, extending through one of the front walls of the casing 1, and opening into the chamber 13, above referred to.

With reference to the figures of the drawings, it will be seen that the upper chamber 53 of the cylinder 4 is tightly closed at its upper end by means of a metallic cap 55, in the center of which is slidably arranged a flat valve 56, adapted to obturate the inlet orifice 57 of said chamber, being normally held in its position of closure by a spring 58 or similar means.

The plunger or piston 27 is provided in the top of its head with an interchangeable bushing 59, formed with a central opening 60, to establish the communication between the upper and lower chambers 61 and 62, respectively, of the cylinder 4 and adapted to be obturated, at a given time, by a flat seated valve 63, normally held in its position of closure by a spring 64 or the like.

The rod 26 of the piston 27 is provided over its entire length with a wick 65 of absorbent material, for lubricating the operative parts, as will hereinafter be explained.

Finally, it will be seen in the drawings, that from the lower part of the casing 1 projects a short vertical extension 66, of cylindrical section, to the free end of which is connected by screws 67, a flat disc 68; and at the upper end or front side of the cylinder 4, suitable openings 69 or other means are provided for the eventual adaptation of a handle or bar 70, substantially of straight form.

The novel type of apparatus above described is adapted to one of the wheels of a vehicle, one of the rear wheels, for instance, in the manner illustrated in Figure 3. For this purpose, the bar 30, for rotating the crank shaft 25, is secured to the central cap 71 of the wheel hub 72 or to another convenient part rigid with the same, by means of bolts 73 or the like. On the other hand, the casing 1 and integral cylinder 4 are rigidly affixed to the underframe of the vehicle or other convenient part of the same by means of a rod 74, one end of which may be secured, for instance, to the respective mud guard 75, while its other end is formed with a circular clamping collar 76, rotatably applied to the lower extension 66 of the casing 1 and retained in position by the disc 68. The rod or bar 74 is provided at a suitable point with a spherical joint 77, which will allow the bar 74 to adapt itself to the different lateral movements of the wheels, as well as to the rising and descending movements of the axles of the same, under the yielding operation of the several suspension devices.

In these conditions, the outlet tube 32 of the arm 30 is connected to the usual air feed valve 33 by means of the tube 35, of rubber or similar flexible material, provided, as above set forth, with a suitable device for constantly maintaining the usual ball of said valve in its open position. The outlet duct 20 of the chamber 13 is connected, in turn, by means of a suitable coupling 78 to another flexible tube 79, extended by the internal or external part of the rod 74, and the opposite end 80 of which communicates with three or more similar ducts, not shown, independently connected to the tires of other wheels of the vehicle by any suitable connecting means, provided with means for holding the valves thereof in their open position.

From the foregoing description it will be seen that when the vehicle is running, the wheel 71 will cause, by means of the arm 30, the rotation of the crank shaft 25 which through the connecting rod 26 will cause the reciprocating motion of the plunger 27 in the cylinder 4, supported in a substantially fixed position by the supporting bar 74, except the slight movements allowed by the joint 77 and collar 76, for enabling the apparatus to accommodate itself to the usual movements of the axle of the wheel.

During its rising stroke, the plunger 27 will produce in the lower chamber 62 of the cylinder 4, a certain degree of vacuum which will in consequence cause the entrance into the said chamber of a certain amount of outer air which, after entering by the protected openings 19 and passing through the filtering layer 7 and perforate plates or wire gauze 8, will then pass by the openings 6 of the casing 1, to the said chamber 62.

At the subsequent descent of said plunger, the air accumulated in said chamber 62 causes, by reaction, the opening of the valve 63, overcoming the resistance of the spring 64, so as to uncover the opening of the orifice 60 of said plunger, whereupon the air will be allowed to freely flow from the chamber 62 to the upper chamber 61. During this stage, the upper valve 56 of the cylinder 4 is kept closed by the resilient action of the spring 58.

During the following rise of the plunger 26, the cycle of intake of outer air, above described, is repeated, and simultaneously, the closure of the valve 63 is effected by the action of the spring 64, owing to which the air confined in the upper chamber 61 will be strongly compressed and cause, by reaction, the opening of the upper valve 56; the compressed fluid will then pass by the opening 57 to the chamber 53 and thence continue its travel through the duct 52, duct 49 and cover 47, as indicated by the arrows in Figure 2, and will thus arrive at the central duct 51 of said cover, in the outlet of which is tightly fitted the semi-spherical extension 43 of the central bushing 42, controlled by the action of the spring 81', and in consequence, part of said fluid will be compelled to enter into the central duct 44 of said extension, whence it will flow by the radial ducts 45 of said bushing, orifice 46 of one of the membranes or diaphragms 39, ducts 28 and 31 of the crank shaft 25 and supporting arm or bar 30, being finally led to the feed valve 33 of the tire 34 by the rigid tube 32 and flexible duct 35, so as to constantly maintain the pressure within the respective tire at the required degree for working.

The remainder of the compressed fluid arriving at the central duct 51 of the cover 47 will be deviated by the duct 50 of said cover, as indicated by the arrow in Figure 2, and after flowing through the orifice 54 of the casing 1, will reach the interior of the chamber 13, where it will be thoroughly filtered by the body 19, and in this condition, said fluid will be discharged by the opening 20 for continuing its travel by the tubes 79 and 80, connected to the other tires of the vehicle, of which the valves will be held in their open position, in the same manner as above described.

In view of the balls of the valves being held in their open position, the circuit of the compressed air will be reversible, as the fluid may pass indifferently from the compressor to any of the tires, subject, for the time being, to a pressure lower than the normal degree, but in case that the pressure in any one of them should exceed the maximum required for operation, the compressed air will return to the circuit, so that the internal pressure of said tire will be conveniently equalized. The valve 22 allows of adjusting said pressure to a predetermined maximum degree, in accordance with the condition of traveling of the vehicle.

The lubricating fluid 14, contained in the chamber 12, will rise by capillarity to the upper limit of the wick 16 of absorbent material, thereby impregnating the disc 18, of similar material. When at its descending stroke the plunger reaches its lowermost position, it will cause a strong compression of said disc 18, so as to extrude therefrom part of the lubricant with which it is saturated, some of which will be used for lubricating the internal surface of the cylinder, while another small amount will be carried by the absorbing wick 65 to the contact surfaces of the other movable members, so as to assure a perfect lubrication of all of them.

In order to facilitate the free operation of the diaphragms 39, small openings 81 and 82 have been provided in the cover 47 and in the crank shaft 25, respectively, so as to allow the free escape to the outer air of the fluid which might accumulate between said elements and the said diaphragms, owing to leakage from the joints.

When it is desired to inflate or to increase the pressure in one of the tires while the vehicle is stopped, then the manual control lever 70 is connected to the cylinder 4 and the bar 74 is dismounted, whereupon, by means of said lever, the cylinder 4 is caused to revolve around the wheel 71, so as to produce a relative motion between said cylinder and the respective plunger 27, with the same results as those previously described.

From the foregoing description, the nature of this invention and the manner of operating of the same will have clearly been understood and no further explanations will be required by those skilled in the art.

It will be evident that several modifications of construction and detail may be introduced, without departing from the scope of this invention, as clearly defined and set forth in the final claims annexed to this specification.

I claim:

1. An apparatus carried by a wheel of a vehicle for inflating the tires thereof while the vehicle is in motion, comprising: a compressor assembly including, a crank-case formed to provide a crank-shaft journal bearing and also to provide an air intake chamber and a compressed air filtering chamber; a crank-shaft journaled in said crank-case and having an air duct, a cylinder including a head surmounting the crank-case and in ported communication at its lower end with said air intake chamber of the crank case, a piston slidable in the cylinder, a valve in the piston spring-urged to open on its inward stroke to receive air from the air intake chamber and to close on the outward compression stroke of the piston, said cylinder head having a valve chamber which receives air compressed by the outward stroke of the piston, and the wall of the said cylinder having a vertical passage including inlet and outlet ends and which inlet end communicates with said valved chamber, a cover plate secured to the crank-case over the outer end of the journal bearing, said cover plate having radial ducts converging inwardly to a central transverse duct, one of said radial ducts communicating with the outlet end of said vertical passage of the cylinder and the other communicating with said air filtering chamber, an air transfer unit disposed between one end of the crank-shaft and the cover plate, said unit including a ported semi-spherical extension whose port registers with the central transfer duct of the cover plate, and said unit also having duct means leading to the duct of the crank-shaft, a bracket for mounting the compressor unit on the wheel of the vehicle, said bracket being keyed to the journal portion of the crank-shaft and having a conduit communicating with the outlet end of the duct of the crank shaft, a tubular flexible connection between the bracket and the tire of the wheel on which the bracket is mounted, a rod connecting the compressor assembly to a fixed part of the vehicle to maintain said assembly stationary relative to the crank-shaft, and a flexible connection leading from said air filtering chamber to the tires on other wheels of the vehicle.

2. An apparatus according to claim 1 wherein the air filtering chamber in the crank-case is provided with pressure regulating valve means.

3. An apparatus carried by the wheel of a vehicle for inflating the tires thereof, said apparatus comprising: a compressor assembly, including, a crank-case including an air intake chamber, a cylinder surmounting the crank-case and having a passage in its side wall, the inlet end of said passage communicating with a valved compression chamber in the cylinder, a valved piston in the cylinder in ported communication with the air intake chamber of the crank-case, a crank-shaft in the crank-case and having an air duct including inlet and oulet ends, a connecting rod between the piston and said crank-shaft, a cover plate secured to one side of the crank-case and covering the outer end of the crank-shaft, said cover plate having a radial duct and an axial transverse duct communicating with the outlet end of said passage, an air transfer unit between one end of the crank-shaft and the inner face of the cover plate, said unit having duct means communicating with the transverse duct of the cover plate and also communicating with the inlet end of said air duct of the crank-shaft, a bracket connected with the crank-shaft at the end thereof opposite the air transfer unit, said bracket secured to a wheel of the vehicle and having a passage communicating at one end with the outlet end of the duct of the crank-shaft and leading to a flexible connection attached to a valve of the tire of the wheel to which the bracket is secured, and means connected with the crank-case of the compressor assembly for attaching the same to a fixed part of the vehicle to maintain said unit stationary with respect to the crank-shaft.

4. An apparatus carried by the wheel of a vehicle for inflating the tires thereof, comprising, a compressor assembly, including, a lower crank-case portion and an upper crank-case portion formed to provide an air intake chamber and also forming bearings for a crank-shaft, at least one crank-case portion having an air intake port and one portion having a compressed air filtering chamber, and the other portion having a lubricant storage chamber, a pressure relief valve for said compressed air filtering chamber, a cylinder on the upper crank-case portion and in ported communication with the said air intake chamber, said cylinder having a passage in its side wall and a valved chamber in the cylinder head communicating with the inlet end of said passage, lubricant feeding wick means leading from said lubricant storage chamber to the cylinder, a valved piston in the cylinder, a crank-shaft journaled in the bearings of the crank-case and having an air duct, a rod connecting said crank-shaft and piston, an air transfer unit at one end of the crank-shaft and having duct means communicating with the air duct of the crank-shaft, a cover plate having a plurality of radial ducts therein converging to a central transverse duct, one of said radial ducts establishing communication with the outlet end of said passage in the cylinder and the air transfer unit and the other of said radial ducts communicating with said compressed air filtering chamber, a hollow bracket keyed to the crank-shaft and in communication with the outlet end of the air duct of the crank shaft, said bracket connected to the vehicle wheel, a flexible hose connection from the bracket to the tire of the wheel which carries the bracket, a rod connected at one end to the compressor assembly and having its other end flexibly connected to a fixed part of the vehicle, and an air hose leading from said air filtering chamber along said rod and adapted to supply compressed air to the tires of other wheels of the vehicle.

GEORGES CHARLES SCHÜLE.